(12) United States Patent
Aoyama et al.

(10) Patent No.: US 8,053,491 B2
(45) Date of Patent: Nov. 8, 2011

(54) BIODEGRADABLE RESIN COMPOSITION AND MOLDED ARTICLE OF THE SAME

(75) Inventors: Taizo Aoyama, Takasago (JP); Nobuo Nakamura, Nishinomiya (JP); Yoshihiko Hashimoto, Ibaraki (JP); Noriyuki Suzuki, Kawanishi (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 12/376,732

(22) PCT Filed: Aug. 9, 2007

(86) PCT No.: PCT/JP2007/065663
§ 371 (c)(1),
(2), (4) Date: Apr. 8, 2009

(87) PCT Pub. No.: WO2008/018567
PCT Pub. Date: Feb. 14, 2008

(65) Prior Publication Data
US 2010/0041791 A1 Feb. 18, 2010

(30) Foreign Application Priority Data

Aug. 10, 2006 (JP) ................................. 2006-218491
Aug. 11, 2006 (JP) ................................. 2006-219253

(51) Int. Cl.
C08K 5/10 (2006.01)
C08K 5/101 (2006.01)
C08K 5/103 (2006.01)
C08K 5/11 (2006.01)

(52) U.S. Cl. ......... 523/122; 524/306; 524/312; 524/315

(58) Field of Classification Search ................ 523/124, 523/122; 524/312, 313, 306, 315
See application file for complete search history.

(56) References Cited

U.S. PATENT DOCUMENTS

| 5,693,389 | A | 12/1997 | Liggat |
| 7,452,960 | B2 * | 11/2008 | Yano et al. ............... 528/361 |
| 2003/0083440 | A1 | 5/2003 | Sashida et al. |
| 2003/0181555 | A1 * | 9/2003 | Figuly .................. 524/284 |
| 2008/0033118 | A1 * | 2/2008 | Kobayashi et al. ......... 525/450 |

FOREIGN PATENT DOCUMENTS

| JP | 04-136067 A | 5/1992 |
| JP | 07-068443 A | 3/1995 |
| JP | 08-510498 A | 11/1996 |
| JP | 2002-080703 A | 3/2002 |
| JP | 2003-073532 A | 3/2003 |
| JP | 2004-059789 A | 2/2004 |
| JP | 2004-161802 A | 6/2004 |
| JP | 2005-501927 A | 1/2005 |
| JP | 2005-162884 A | 6/2005 |
| JP | 2005-320389 A | 11/2005 |
| JP | 2006-124446 A | 5/2006 |
| JP | 2006-168159 A | 6/2006 |
| WO | 02/085983 A1 | 10/2002 |

* cited by examiner

*Primary Examiner* — Kriellion Sanders
(74) *Attorney, Agent, or Firm* — Sughrue Mion, PLLC

(57) ABSTRACT

An object of the invention is to provide a resin composition which is particularly excellent in impact resistance, tensile elongation characteristics, heat resistance, surface properties, moldability and the like accompanied by less time dependent alteration of these properties and which is produced by mixing a certain plasticizer with a biodegradable polymer of plant origin, and to provide a molded product of the composition. The present invention can provide a resin composition comprising a biodegradable 3-hydroxyalkanoate copolymer (A) and a plasticizer (B), wherein: the biodegradable 3-hydroxyalkanoate copolymer (A) has a recurring unit represented by the structure formula (1): [—CHR—CH$_2$—CO—O—] (wherein, R represents an alkyl group represented by C$_n$H$_{2n+1}$; and n is an integer of 1 to 15); the plasticizer (B) is based upon a polyglycerol acetic acid ester having an acetylation degree of no less than 50% ester.

7 Claims, No Drawings

BIODEGRADABLE RESIN COMPOSITION AND MOLDED ARTICLE OF THE SAME

TECHNICAL FIELD

The present invention relates to a composition including a polymer which is biodegradable and of plant origin, and a molded product of the same. More particularly, the present invention relates to a resin composition which includes a certain plasticizer and a biodegradable aliphatic polyester-based resin, particularly a biodegradable 3-hydroxyalkanoate copolymer, and to a molded product of the same. Preferably, the invention relates to a resin composition which includes a certain plasticizer and a biodegradable aliphatic polyester-based resin, particularly a 3-hydroxyalkanoate copolymer, and poly 3-hydroxyalkanoate having a melting temperature higher than that of the copolymer, and to a molded product of the same.

BACKGROUND ART

Conventionally, plastics have characteristics such as processibility and usability, whereas, they have been thrown away after use owing to their difficulty in recycling, and to hygienic point of view. However, as the use and disposal of the plastics increase, problems associated with their disposal by landfilling or incineration have drawn attention, and they may be responsible for great burden on the global environment such as deficiency of garbage landfill sites, influences on ecological system by remaining nondegradable plastics in the environment, generation of detrimental gas in combustion, global warming resulting from a large amount of combustion calorie, and the like. In recent years, biodegradable plastics have been extensively developed as a material which can solve the problems of the plastic waste.

Additionally, these biodegradable plastics are of plant origin, and absorb and immobilize carbon dioxide that is present in the air. Carbon dioxide generated in combustion of these biodegradable plastics of plant origin was originally present in the air, therefore increase in carbon dioxide in the ambient air is not caused. This phenomenon is referred to as "carbon neutrality", which tends to have been placed importance thereon. Carbon dioxide immobilization is expected to be effective in preventing the global warming. Particularly, in connection with Kyoto Protocol in which achievement level of carbon dioxide reduction was suggested, deliberation of Congress for ratification was approved in Russia in August 2003. Accordingly, it is highly probable that the Protocol will come into effect actually, whereby materials for carbon dioxide immobilization have drawn a great deal of attention, and active use thereof has been desired.

Meanwhile, although aromatic polyesters have been produced and consumed in large quantities as general-purpose polymers, in light of immobilization of carbon dioxide and prevention of global warming, they are not preferable material in terms of the carbon neutrality, because they are produced from fossil fuels, thereby leading to release of carbon dioxide immobilized in the ground to the ambient air.

In light of the biodegradability and carbon neutrality, aliphatic polyester-based resins have drawn attention as the plastics of plant origin, particularly polylactic acid-based resins, poly 3-hydroxyalkanoate (hereinafter, may be referred to as "PHA"), further poly[3-hydroxybutyrate-co-3-hydroxyhexanoate] (hereinafter, may be referred to as "PHBH"), and the like have been drawing attention.

Among them, poly[3-hydroxybutyrate-co-3-hydroxyhexanoate], in particular, has superior heat resistance owing to the crystallinity, and impact resistance, superior tensile elongation characteristics and flexibility resulting from 3-hydroxyhexanoate included as a copolymerization component, in combination. Therefore, they have drawn attention as a resin material accompanied by the balance of physical properties.

However, with respect to PHA, further greater impact resistance, tensile elongation characteristics, and moldability have been demanded, and improvement for time dependent alteration at room temperatures has been also demanded.

In this respect, improvement by adding a certain plasticizer was proposed (Patent Documents 1 to 3). However, bleed out properties, and volatility are not sufficiently improved by them, and polylactic acid is predominantly used as a biodegradable polymer. Moreover, any effect of improving the time dependent alteration is not referred to at all.

Furthermore, in order to improve the molding processibility of PHA, addition of another PHA having a higher melting temperature as a nucleating agent to PHA as a matrix was proposed (Patent Document 4), but significant time dependent alteration of physical properties was caused, and also a low level of tensile elongation characteristics was observed.

Patent Document 1: Japanese Examined Patent Application, Publication No. H07-68443
Patent Document 2: Japanese Unexamined Patent Application, Published Japanese Translation of a PCT Application No. 2005-501927
Patent Document 3: Japanese Unexamined Patent Application, Publication No. 2002-80703
Patent Document 4: Japanese Unexamined Patent Application, Published Japanese Translation of a PCT Application No. H08-510498

DISCLOSURE OF THE INVENTION

Problems to be Solved by the Invention

The present invention solves the aforementioned problems, and an object of the invention is to provide a resin composition which is particularly excellent in impact resistance, tensile elongation characteristics, heat resistance, surface properties (bleed characteristics), moldability and the like accompanied by less time dependent alteration of these properties and which is produced using a polymer of plant origin obtained by actively immobilizing carbon dioxide that is present around the earth, and to provide a molded product of the composition.

Means for Solving the Problems

The present inventors elaborately investigated in order to solve the aforementioned problems, and consequently found that a resin composition which is excellent in impact resistance, tensile elongation characteristics, heat resistance, surface properties, moldability and the like accompanied by less time dependent alteration of these properties, and a molded product of the same can be obtained by mixing a certain plasticizer with a 3-hydroxyalkanoate copolymer that is a polymer of plant origin which is biodegradable and is obtained by actively immobilizing carbon dioxide around the earth at a given ratio. Accordingly, the present invention was accomplished.

Specifically, a first aspect of the present invention provides a resin composition including 100 parts by weight of (A) a biodegradable 3-hydroxyalkanoate copolymer having a recurring unit represented by the structural formula (1): [—CHR—CH$_2$—CO—O—] (wherein, R represents an alkyl group represented by $C_nH_{2n+1}$; and n is an integer of 1 to 15), and 0.1 to 50 parts by weight of (B) a plasticizer which is constituted with 100 to 50% by weight of a polyglycerol acetic acid ester having an acetylation degree of no less than 50%, and 0 to 50% by weight of a monoglycerol ester.

In this aspect of the invention, it is preferred that: (C) a biodegradable poly 3-hydroxyalkanoate having a melting temperature Tm2 higher than the melting temperature Tm1 of the copolymer (A) is further included; the melting temperature Tm2 of the biodegradable poly 3-hydroxyalkanoate (C) satisfies the relational expression of Tm2≧Tm1+5° C.; and the resin composition contains 0.1 to 30 parts by weight of the biodegradable poly 3-hydroxyalkanoate (C) based on 100 parts by weight of the copolymer (A).

In addition, the copolymer (A) preferably includes poly[3-hydroxybutyrate-co-3-hydroxyhexanoate] having a recurring unit of 3-hydroxybutyrate and a recurring unit of 3-hydroxyhexanoate as a principal component, and more preferably the copolymer (A) is poly[3-hydroxybutyrate-co-3-hydroxyhexanoate].

Moreover, it is preferred that the copolymer (A) has a molecular weight of 300,000 to 3,000,000 in terms of the weight average molecular weight.

Furthermore, in connection with the component ratio of the recurring units of poly[3-hydroxybutyrate-co-3-hydroxyhexanoate], the component ratio of 3-hydroxybutyrate unit/3-hydroxyhexanoate unit is preferably 99/1 to 80/20 (mol/mol).

Additionally, the polyglycerol acetic acid ester having an acetylation degree of no less than 50% is preferably at least one selected from the group consisting of a diglycerol acetic acid ester and a triglycerol acetic acid ester having an acetylation degree of no less than 50%.

Further, it is preferred that the monoglycerol ester be diacetylmonoacylglycerol with a constitutive fatty acid having no less than 8 carbon atoms.

Moreover, the biodegradable poly 3-hydroxyalkanoate (C) includes the 3-hydroxybutyrate unit in an amount of preferably no less than 90% by mole, and more preferably, the biodegradable poly 3-hydroxyalkanoate (C) is poly 3-hydroxybutyrate.

Hereinafter, the present invention will be explained in detail. As the biodegradable polymer in the present invention, the (3-hydroxyalkanoate) copolymer (A) having a recurring unit represented by the formula (1): [—CHR—CH$_2$—CO—O—] (wherein, R represents an alkyl group represented by $C_nH_{2n+1}$; and n is an integer of 1 to 15) may be used in light of degradable properties under anaerobic conditions and excellent moisture resistance, and possibility of increase in the molecular weight.

Typical examples of the biodegradable 3-hydroxyalkanoate copolymer (A) in the present invention include e.g., poly[3-hydroxybutyrate-co-3-hydroxyvalerate], poly[3-hydroxybutyrate-co-3-hydroxyhexanoate], poly[3-hydroxybutyrate-co-3-hydroxyoctanoate], poly[3-hydroxybutyrate-co-3-hydroxydecanoate], and the like. Among these, poly[3-hydroxybutyrate-co-3-hydroxyhexanoate] is preferably included as a principal component. The phrase "including poly[3-hydroxybutyrate-co-3-hydroxyhexanoate] as a principal component" referred to herein means that poly[3-hydroxybutyrate-co-3-hydroxyhexanoate] accounts for no less than 70% in the copolymer (A). The copolymer (A) including poly[3-hydroxybutyrate-co-3-hydroxyhexanoate] at the rate of no less than 90% is more preferred. Further preferably, the copolymer (A) includes poly[3-hydroxybutyrate-co-3-hydroxyhexanoate] alone, and is a copolymer produced by a microorganism.

Examples of the microorganism described above include e.g., Alcaligenes eutrophus AC32 strain (International Deposition with international depositary authority under the Budapest Treaty: National Institute of Advanced Industrial Science and Technology, International Patent Organism Depositary (Tsukuba Central 6, 1-1-1 Higashi, Tsukuba, Ibaraki, Japan), original deposition date: Aug. 12, 1996, transferred on Aug. 7, 1997, Deposition No. FERM BP-6038, transferred from original Deposition FERM P-15786, (J. Bacteriol., 179, 4821 (1997)), which had been prepared by introducing a PHA synthase gene derived from *Aeromonas caviae* into *Alcaligenes eutrophus*, and the like.

The biodegradable poly[3-hydroxybutyrate-co-3-hydroxyhexanoate] herein refers to a name which is employed as a generic name of a copolymer having a recurring unit of 3-hydroxybutyrate and a recurring unit of 3-hydroxyhexanoate as principal components. The copolymer may also include the other monomer component as described above as long as 3-hydroxybutyrate and 3-hydroxyhexanoate are included as principal components. Further, the polymerization process for obtaining the aforementioned copolymer is not particularly limited, and any copolymerization process such as random copolymerization, alternating copolymerization, block copolymerization or the like may be applied.

The constituent ratio of the recurring units in the biodegradable poly[3-hydroxybutyrate-co-3-hydroxyhexanoate] in the present invention is preferably 99/1 to 80/20 (mol/mol), more preferably 98/2 to 82/18 (mol/mol), and still more preferably 97/3 to 85/15 (mol/mol) in terms of 3-hydroxybutyrate unit/3-hydroxyhexanoate unit. The constituting ratio of the recurring units of poly[3-hydroxybutyrate-co-3-hydroxyhexanoate] may be abbreviated as HH rate.

The weight average molecular weight (Mw) of the biodegradable 3-hydroxyalkanoate copolymer (A) of the present invention is preferably 300,000 to 3,000,000, more preferably 400,000 to 2,500,000, and still more preferably 500,000 to 2,000,000 in light of the impact resistance and tensile elongation characteristics. When the weight average molecular weight of the copolymer (A) is less than 300,000, mechanical characteristics may be inferior, while when the weight average molecular weight exceeds 3,000,000, the processing may be difficult.

The method of measuring the weight average molecular weight of the biodegradable 3-hydroxyalkanoate copolymer (A) is not particularly limited, but herein the molecular weight can be determined in terms of the polystyrene equivalent measured with a GPC system manufactured by Waters Corporation equipped with a column Shodex K-804 (polystyrene gel) manufactured by Showa Denko K. K., using chloroform as a mobile phase.

The plasticizer (B) used in the present invention is a plasticizer that includes 100 to 50% by weight of a polyglycerol acetic acid ester having an acetylation degree of no less than 50%, and 0 to 50% by weight of a monoglycerol ester.

By including the plasticizer (B) containing a polyglycerol acetic acid ester having an acetylation degree of no less than 50% as a principal component into the resin composition of the present invention, bleed out of the plasticizer is minimized, and a resin composition accompanied by less generation of the volatile component can be obtained since the polyglycerol acetic acid ester having an acetylation degree of no less than 50% is particularly excellent in compatibility with the copolymer (A).

As a simple method for producing the polyglycerol acetic acid ester having an acetylation degree of no less than 50% used in the present invention, generally, a method in which polyglycerol is reacted with acetic anhydride to permit acetylation, and then acetic acid yielded as a by-product is eliminated may be exemplified, but not particularly limited thereto.

In the polyglycerol acetic acid ester having an acetylation degree of no less than 50% used in the present invention, the number n of recurrence of the glycerol units in polyglycerol is preferably 2 to 5, and more preferably 2.

In the case of the diglycerol acetic acid ester in which the number n of recurrence of the glycerol units is 2, examples of those having an acetylation degree of no less than 50% include simple forms of the diester, triester or tetraester, and mixtures thereof. In light of compatibility with the copolymer (A), and the like, simple forms of the diester and triester, or mixtures thereof are preferred.

The acetylation degree referred to in the present invention means a degree of esterification of acetic acid with respect to the hydroxyl group of polyglycerol, and is derived from the following formula (1):

$$\text{(acetylation degree)} = \text{(ester value)}/\text{(ester value+hydroxyl value)} \times 100 \qquad (1)$$

wherein, (ester value)=(saponification value)–(acid value).
The acetylation degree in the polyglycerol acetic acid ester is preferably no less than 70%, and more preferably no less than 90% in light of the compatibility.

Furthermore, in the monoglycerol ester used in the present invention, the number of carbon atoms of the fatty acid used in esterification may be selected based on the balance between compatibility and volatility. However, since the compatibility is complemented by the polyglycerol acetic acid ester in an aspect of the present invention in which the monoglycerol ester is used in combination with the polyglycerol acetic acid ester, diacetylmonoacylglycerol including a fatty acid having 8 or more carbon atoms as a constitutive fatty acid is preferred in favor of low volatility. Among the fatty acids having 8 or more carbon atoms, caprylic acid, capric acid, lauric acid, oleic acid, erucic acid and the like are preferred taking into account the compatibility, and in particular, caprylic acid, capric acid and lauric acid which are saturated fatty acids are more preferred taking into consideration the oxidation stability. The aforementioned number of carbon atoms is preferably equal to or less than 28 in light of the compatibility (fatty acid having 28 carbon atoms: montanic acid).

It should be noted that diacetylmonoacylglycerol may be obtained by any of the processes involving (i) esterification reaction of monoglycerol with fatty acid, (ii) reaction of acetic anhydride with a distilled monoglyceride or a reactive monoglyceride obtained by a known process such as an interesterification reaction of glycerol with a triglyceride such as a fat (fatty oil) or a fatty acid alkyl ester, (iii) interesterification of triglyceride with triacetin, and the like, but the method is not particularly limited thereto.

With respect to the mixing proportion of the polyglycerol acetic acid ester having an acetylation degree of no less than 50% and the monoglycerol ester in the plasticizer (B) used in the present invention, in light of the effect achieved by mixing, and suppression of bleed out, 100 to 50% by weight of the polyglycerol acetic acid ester having an acetylation degree of no less than 50%, and 0 to 50% by weight of the monoglycerol ester are mixed; 100 to 80% by weight of the polyglycerol acetic acid ester having an acetylation degree of no less than 50%, and 0 to 20% by weight of the monoglycerol ester are preferably mixed; and 100% by weight of the polyglycerol acetic acid ester having an acetylation degree of no less than 50% is more preferably used.

To use the polyglycerol acetic acid ester having an acetylation degree of no less than 50% alone is preferred for achieving the effects such as improvement of time dependent alteration and the like; however, since a monoglycerol ester may be produced and contaminated in some cases depending on the synthetic method, their mixture of both components as they are included may be used.

The amount of the blended plasticizer (B) in the present invention is 0.1 to 50 parts by weight, preferably 0.1 to 30 parts by weight, and more preferably 0.1 to 20 parts by weight based on 100 parts by weight of the biodegradable 3-hydroxyalkanoate copolymer (A). When the amount of the plasticizer (B) is less than 0.1 parts by weight, the effect as a plasticizer is less likely to be exhibited, and tensile elongation at an initial stage may be reduced and the effect of suppressing its time dependent alteration may be deteriorated. Further, when the amount exceeds 50 parts by weight, deterioration of the heat resistance, bleed out properties, reduction of the tensile elongation at an initial stage, deterioration of the effect of suppressing its time dependent alteration, and the like may be caused.

In the present invention, by blending the biodegradable poly 3-hydroxyalkanoate (C) having a melting temperature higher than that of the copolymer (A), the biodegradable poly 3-hydroxyalkanoate (C) serves as a crystal nucleating agent in the resin composition, whereby crystallization of the resin composition can be promoted, and thus the molding processibility can be improved.

More specifically, when the copolymer (A) having a melting temperature Tm1 is melted at a given temperature, crystal nucleus of the poly 3-hydroxyalkanoate (C) having a melting temperature Tm2 that is higher than Tm1 is left unmelted. Thus, a crystal rapidly grows with the unmelted poly 3-hydroxyalkanoate (C) as a nuclear point, whereby the crystallization rate is accelerated.

With respect to the melting temperature Tm1 of the copolymer (A), the melting temperature Tm2 of the biodegradable poly 3-hydroxyalkanoate (C) in the present invention preferably satisfies the relational expression of $Tm2 \geq Tm1+5°$ C.; more preferably satisfies the relational expression of $Tm2 \geq Tm1+10°$ C.; and still more preferably satisfies the relational expression of $Tm2 \geq Tm1+20°$ C. When the melting temperature Tm2 satisfies the relational expression of $Tm2 < Tm1+5°$ C., the effect as a nucleating agent may be unsatisfactory, and thus moldability tends to be depressed.

The melting temperature Tm in the present invention may be determined on the basis of a peak of the endothermic curve drawn along with melting of 1 to 10 mg of a sample of the copolymer (A) or the biodegradable poly 3-hydroxyalkanoate (C) by elevating the temperature from 30° C. at a rate of 10° C./min until being raised to 30 to 40° C. higher than the temperature at which each sample is sufficiently melted, then lowering the temperature at a rate of 10° C./min to 30° C., and again elevating the temperature at a rate of 10° C./min until being raised to 30 to 40° C. higher than the temperature at which each sample is sufficiently melted, using a differential scanning calorimeter (manufactured by Seiko Electronics Co., Ltd., DSC200). In the measurement, when multiple peaks of the endothermic curve are found, the peak of the highest temperature may be decided as Tm.

The poly 3-hydroxyalkanoate (C) having a melting temperature Tm2 is a biodegradable polymer having a recurring unit represented by the structure formula [—CHR—CH$_2$—CO—O—] (wherein, R represents an alkyl group represented by $C_nH_{2n+1}$; n is an integer of from 1 to 15; and R may be the same or different in the polymer). However, when the poly 3-hydroxyalkanoate (C) is a copolymer, the recurring unit may be the same as or different from the recurring unit of the copolymer (A).

The poly 3-hydroxyalkanoate (c) having a melting temperature Tm2 is preferably poly 3-hydroxybutyrate (hereinafter, may be referred to as "PHB") in light of promotion of crystallization, but a recurring unit other than 3-hydroxybutyrate may be included at most 10% by mole as long as the relational expression of Tm2≧Tm1+5° C. is satisfied.

Particularly, when the biodegradable 3-hydroxyalkanoate copolymer (A) having a melting temperature Tm1 is PHBH, and the HH rate is 1 to 20% by mole, the poly 3-hydroxyalkanoate (c) having a melting temperature Tm2 is preferably poly 3-hydroxybutyrate in light of promotion of crystallization.

However, when the 3-hydroxyalkanoate copolymer (A) having a melting temperature Tm1 is PHBH, and the HH rate is 10 to 20% by mole, PHBH having a recurring unit of 3-hydroxybutyrate and 3-hydroxyhexanoate, and having a HH rate of 0.01 to 8% by mole may be used as the poly 3-hydroxyalkanoate (c) having a melting temperature Tm2, in light of uniform dispersibility and compatibility.

The poly 3-hydroxyalkanoate (c) having a melting temperature Tm2 may be obtained by either a method of production from a microorganism or a synthetic method, and the method for production is not particularly limited.

The content of the poly 3-hydroxyalkanoate (c) having a melting temperature Tm2 in the present invention is preferably 0.1 to 30 parts by weight, and more preferably 0.1 to 20 parts by weight based on 100 parts by weight of the 3-hydroxyalkanoate copolymer (A) having a melting temperature Tm1. When the content of the poly 3-hydroxyalkanoate (C) is less than 0.1 parts by weight, the effect as a nucleating agent may be decreased, whereby the moldability is likely to be reduced. In contrast, when the content exceeds 30 parts by weight, the effect to meet the content cannot be expected, and thus such a content is not practical but uneconomical.

In addition to the biodegradable 3-hydroxyalkanoate copolymer (A) and the biodegradable poly 3-hydroxyalkanoate (C), to the resin composition of the present invention may be further added if necessary polyglycolic acid, polylactic acid, poly 4-hydroxybutyrate, poly 4-hydroxyvaleate, poly 3-hydroxyhexanoate or polycaprolactone, as well as at least one aliphatic polyester such as polyethylene adipate, polyethylene succinate, polybutylene adipate or polybutylene succinate, or a copolymer thereof, as a polymer that includes aliphatic polyvalent carboxylic acid and aliphatic polyhydric alcohol as principal constitutive components. The amount of such a polymer blended is preferably 1 to 300 parts by weight, and more preferably 5 to 100 parts by weight based on 100 parts by weight of the biodegradable 3-hydroxyalkanoate copolymer (A).

To the resin composition of the present invention may be added a nucleating agent (D) other than the aforementioned poly 3-hydroxyalkanoate (C) within the range not to impair the physical properties, whereby crystallization can be facilitated. Examples of the other nucleating agent (D) include e.g., high fatty acid amides, urea derivatives, sorbitol-based compounds, boron nitride, high fatty acid salts, aromatic fatty acid salts, and the like. Among these, because of high effect as the nucleating agent, the high fatty acid amides, the urea derivatives, and the sorbitol-based compounds are preferred. These may be used singly, or two or more thereof may be used in combination.

Examples of the high fatty acid amide include behenic acid amide, oleic acid amide, erucic acid amide, stearic acid amide, palmitic acid amide, N-stearylbehenic acid amide, N-stearylerucic acid amide, ethylenebisstearic acid amide, ethylenebisoleic acid amide, ethylenebiserucic acid amide, ethylenebislauryl acid amide, ethylenebiscapric acid amide, p-phenylenebisstearic acid amide, a polycondensation product of ethylene diamine, stearic acid and sebacic acid, and the like. Particularly, behenic acid amide is preferred.

As the urea derivative, bis(stearylureide)hexane, 4,4'-bis(3-methylureide)diphenylmethane, 4,4'-bis(3-cyclohexylureide)diphenylmethane, 4,4-bis(3-cyclohexylureide)dicyclohexylmethane, 4,4'-bis(3-phenylureide)dicyclohexylmethane, bis(3-methylcyclohexylureide)hexane, 4,4'-bis(3-decylureide)diphenylmethane, N-octyl-N'-phenylurea, N,N'-diphenylurea, N-tolyl-N'-cyclohexylurea, N,N-dicyclohexylurea, N-phenyl-N'-tribromophenylurea, N-phenyl-N'-tolylurea, N-cyclohexyl-N'-phenylurea, and the like may be illustrated, and particularly bis(stearylureide)hexane is preferred.

Examples of the sorbitol-based compound include 1,3,2,4-di (p-methylbenzylidene)sorbitol, 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene), 1,3,2,4-di(p-s-butylbenzylidene)sorbitol, 1,3,2,4-di(p-t-butylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorbenzylidenesorbitol, 1,3-p-chlorbenzylidene-2,4-benzylidenesorbitol, 1,3-p-chlorbenzylidene-2,4-p-methylbenzylidenesorbitol, 1,3-p-chlorbenzylidene-2,4-p-ethylbenzylidenesorbitol, 1,3-p-methylbenzylidene-2,4-p-chlorbenzylidenesorbitol, 1,3-p-ethylbenzylidene-2,4-p-chlorbenzylidenesorbitol, 1,3,2,4-di(p-chlorbenzylidene)sorbitol, and the like. Among these, 1,3,2,4-di(p-methylbenzylidene)sorbitol, and 1,3,2,4-dibenzylidenesorbitol are preferred.

The amount of the nucleating agent (D) used in the resin composition of the present invention is preferably 0.1 to 10 parts by weight, more preferably 0.2 to 8 parts by weight, and still more preferably 0.5 to 5 parts by weight based on 100 parts by weight of the (3-hydroxyalkanoate) copolymer (A) in light of the formability. When the amount of the nucleating agent (D) is less than 0.1 parts by weight, the effect as the nucleating agent can be insufficient, while when the amount exceeds 10 parts by weight, the effect can be saturated, leading to economical disadvantage.

In addition, it is preferred that the resin composition of the present invention has a mean crystal particle size of equal to or less than 50 μm, in light of improvement of the impact resistance, tensile elongation characteristics, transparency and the like.

In the resin composition of the present invention, the flexural modulus, heat resistance and the like can be further improved by further adding the filler.

Among the aforementioned fillers, examples of inorganic filler include carbon black, calcium carbonate, silicon oxide and silicic acid salts, zinc white, Hycite clay, kaolin, basic magnesium carbonate, mica, talc, quartz powder, diatomaceous earth, dolomite powder, titanium oxide, zinc oxide, antimony oxide, barium sulfate, calcium sulfate, alumina, calcium silicate and the like, and particularly, mica and talc having a particle size of 0.1 to 30 μm are preferred.

In addition, examples of the other filler include inorganic fibers such as carbon fiber, and organic fibers such as human hair and sheep wool. Moreover, natural fibers such as bamboo fibers, pulp fibers, kenaf fibers, analogous other plant alternatives, annual herb plants of genus Hibiscus in family Malvaceae, annual herb plants of family Tiliaceae, and the like can be also used. In light of reduction of carbon dioxide, natural fibers of plant origin are preferred, and particularly, kenaf fibers are preferred.

The amount of the filler used in the resin composition of the present invention is preferably 0.1 to 100 parts by weight, more preferably 0.1 to 80 parts by weight, and still more preferably 0.1 to 50 parts by weight based on 100 parts by weight of the 3-hydroxyalkanoate copolymer (A), in light of physical properties, formability, and costs. When the amount of the filler is less than 0.1 parts by weight, less improvement of the physical properties is likely to be achieved, while the filler exceeding 100 parts by weight is apt to result in lowering of the impact strength.

To the resin composition of the present invention may be added a known modifier, a thermoplastic resin, or a thermosetting resin in the range not to inhibit the effects of the present invention. Examples of typical modifier include core shell type graft copolymers having a core of an acrylic rubber, an acryl silicone composite rubber, a butadiene rubber or the like, molding processibility modifiers including an acrylic high molecular polymer, and the like. Examples of the thermoplastic resin include general-purpose thermoplastic resins such as polyolefin-based resins like polypropylene and polyethylene, polyvinyl chloride-based resins, polystyrene-based resins, ABS-based resins, acrylic resins and the like, as well as general-purpose engineering plastics such as polyethylene terephthalate-based resins, polybutylene terephthalate-based resins, polycarbonate-based resins, polyamide-based resins and the like. In addition, epoxy resins and the like may be exemplified as typical thermosetting resins.

Into the resin composition of the present invention can be compounded a filler; a colorant such as a pigment or a dye; an odor absorbent such as activated charcoal or zeolite; a flavor such as vanillin or dextrin; an antioxidant; an anti-oxidizing agent; a weather resistance improving agent; a stabilizer such as an ultraviolet ray absorbing agent; a plasticizer other than the component (B) described above; a lubricant; a release agent; a water repellent agent; an antimicrobial agent; a slidability improving agent; and other secondary additive, as needed. The aforementioned additives may be used alone, or two or more thereof may be used in combination.

The resin composition of the present invention can be produced by a known method. For example, as the method of heat melting and mixing, mixing by mechanical agitation with a single screw extruder, a twin screw extruder, a tank having a kneader, a gear pump, a kneading roll, a stirrer or the like; application of a static mixer in which dividing and joining of the flow are repeated by a flow guide apparatus; and the like may be exemplified. In the case of heat melting, it is necessary to mix while paying attention to lowering of the molecular weight of PHA resulting from thermal degradation. The heat melting is preferably carried out at a temperature of 160 to 170° C. In addition, there is also a method of obtaining the resin composition of the present invention including dissolving in a solvent to permit dissolution, and thereafter removing the solvent.

Final composition can be also produced by forming a master batch with a combination in part of each component used in the present invention beforehand, and thereafter adding the residual component(s). Thus, compatibility of each component is improved, whereby physical property balance can be improved.

The resin composition of the present invention can be processed by extrusion molding, or injection molding. Further, using the extrusion molding machine as described above, it may be processed into the shape of pellet, block, film, sheet or the like. After pelletizing once so as to provide favorable dispersibility of various components, the pellet may be processed into the shape of film or sheet by an injection molding machine or an extruder. Alternatively, processing to obtain a film or sheet can be executed with a calender molding machine, a roll molding machine, or an inflation molding machine. Moreover, the film or the sheet obtained from the composition of the present invention can be subjected to thermal molding by heat, vacuum molding, press molding or the like. In addition, hollow molding by a blow molding machine can be carried out. Further, it can be formed into fibers by melt spinning or the like.

The molded product obtained using the resin composition of the present invention has efficiently improved impact resistance, tensile elongation characteristics, surface properties and molding processibility while retaining high heat resistant characteristics as a crystallizable polymer of the biodegradable 3-hydroxyalkanoate copolymer (A). In addition, surprisingly, time dependent alteration of impact resistance and tensile elongation characteristics can be significantly improved.

The resin composition of the present invention is formed into a variety of molded articles such as fiber, string, rope, woven fabric, knit fabric, nonwoven fabric, paper, film, sheet, tube, plate, bar, vessel, bag, accessory, foam and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded articles obtained in this manner can be suitably used in fields such as agriculture, fishery, forestry, horticulture, medicine, sanitary goods, food industry, clothing, nonclothing, packaging, automobile, building material, and others.

Effects of the Invention

The present invention can provide a resin composition which is excellent in impact resistance, tensile elongation characteristics, heat resistance, surface properties (bleed characteristics), moldability and the like accompanied by less time dependent alteration of these properties, and a molded product of the same by blending: a plasticizer (B) including a polyglycerol acetic acid ester having an acetylation degree of no less than 50% as a principal component, into a biodegradable poly 3-hydroxyalkanoate copolymer (A).

BEST MODE FOR CARRYING OUT THE INVENTION

Next, the composition of the present invention, and the molded article thereof will be explained in more detail by way of Examples, but the present invention is not limited just to these Examples.

The resins and additives used in this Example are as follows.

A-1: PHBH
poly[3-hydroxybutyrate-co-3-hydroxyhexanoate] (HH rate= 12%, Mw=500,000, melting temperature: 120° C.)

B-1: plasticizer
manufactured by Riken Vitamin Co., Ltd., RIKEMAL PL710 (polyglycerol acetic acid ester having an acetylation degree of 99%/monoglycerol ester=90% by weight/10% by weight)

B-2: plasticizer
manufactured by Riken Vitamin Co., Ltd., RIKEMAL PL012 (glycerin diacetomonolaurate having an acetylation degree of 66%)

B-3: plasticizer
ATBC/tributyl acetylcitrate

C-1: PHB
poly 3-hydroxybutyrate (PHB, manufactured by BAIOMER, Mw=750,000, melting temperature: 171° C.)

D-1: nucleating agent
behenic acid amide (manufactured by CRODA JAPAN KK, Incroslip B)

E-1: hindered pheolic antioxidant (manufactured by Ciba Specialty Chemicals Holding Inc., IRGANOX-1010)

PHBH (A-1) having an HH rate of 12% by mole, and a Mw (weight average molecular weight) of about 500,000, produced using Alcaligenes eutrophus AC32 strain (J. Bacteriol., 179, 4821 (1997), FERM BP-6038) which had been prepared by introducing a PHA synthetic enzyme gene derived from Aeromonas caviae into Alcaligenes eutrophus as a microorganism through arbitrarily adjusting the raw material and culture conditions was used.

Conditions for Culturing Microorganism

Culture was conducted as in the following.

Composition of the preculture medium included 1 w/v % Meat-extract, 1 w/v % Bacto-Trypton, 0.2 w/v % Yeast-extract, 0.9 w/v % $Na_2HPO_4 \cdot 12H_2O$, and 0.15 w/v % $KH_2PO_4$, with a pH of 6.7.

Composition of the medium for producing polyester included 1.1 w/v % $Na_2HPO_4 \cdot 12H_2O$, 0.19 w/v % $KH_2PO_4 \cdot 0.6$ w/v % $(NH_4)_2SO_4$, 0.1 w/v % $MgSO_4 \cdot 7H_2O$, and a 0.5 v/v % solution of a trace metal salt (prepared by dissolving 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, 0.012 w/v % $NiCl_3 \cdot 6H_2O$ and 0.01 w/v % $CRCl_3 \cdot 6H_2O$ in 0.1 N hydrochloric acid), with PKOO (palm kernel olein oil) used as a carbon source. The culture was conducted by feeding culture while feeding the carbon source.

A glycerol stock of a PHBH-producing strain was inoculated into the preculture medium, and cultured for 20 hrs. Thereafter, the culture was inoculated into a 5-L jar fermenter (manufactured by B. E. MARUBISHI Co., Ltd., model MD-500) charged with 2.5 L of the culture medium for production at 10 v/v %. The operating conditions involved a culture temperature of 28° C., an agitating speed of 420 rpm and a ventilation volume of 0.6 wm, and the pH was adjusted to be from 6.6 to 6.8. For adjusting the pH, 14% aqueous ammonia was used. The culture was conducted for upto 65 hrs. Following the culture, bacterial cells were recovered by centrifugal separation, washed with methanol, and lyophilized. The lyophilized bacterial cells were extracted with chloroform, and the residues of the bacterial cells were filtrated. Thereafter, hexane was added to the filtrate to allow PHBH to be deposited. PHBH was recovered by filtration, washed with hexane, and dried to prepare PHBH.

Measurement of Melting Temperature Tm of PHA Copolymer (A) or PHA (C) Using a differential scanning calorimeter (manufactured by Seiko Electronics Co., Ltd., DSC200), the temperature of 1 to 10 mg the PHA copolymer (A) or PHA (C) was elevated from 30° C. to 200° C. at a rate of 10° C./min, and then lowered from 200° C. to 30° C. at a rate of 10° C./min. Subsequently, the temperature was elevated again from 30° C. to 200° C. at a rate of 10° C./min. The peak of the endothermic curve drawn along with melting of the PHA copolymer (A) or PHA (C) was recorded, and decided as a melting temperature Tm. When multiple peaks of the endothermic curve were found in elevating the temperature again, top temperature at the peak with the greatest endothermic quantity was decided as Tm.

EXAMPLES 1 TO 3

A mixture of poly[3-hydroxybutyrate-co-3-hydroxyhexanoate] (PHBH), the plasticizer, the nucleating agent and the antioxidant at the blending proportion shown in Table 1 was subjected to melt kneading using a twin screw extruder (manufactured by Japan Steel Works, Ltd., TEX30a) at a cylinder setting temperature of 130° C. to obtain a pellet of the composition. Thus resulting composition was evaluated on the sheet moldability, the impact resistance, the tensile elongation at break, the bleed characteristics and the heat resistance. The results are shown in Table 1.

COMPARATIVE EXAMPLES 1 TO 4

At the blending proportion shown in Table 1, pellets of resin compositions were obtained in a similar operation to that in Example 1. Thus resulting resin composition pellet was evaluated on the sheet moldability, the impact resistance, the tensile elongation at break, the bleed characteristics and the heat resistance. The results are shown in Table 1.

Evaluation methods of the resulting resin compositions are as in the following.

Evaluation of Tensile Elongation Characteristics

The pellets obtained in Examples 1 to 3 and Comparative Examples 1 to 4 were dried at 80° C for 5 hrs, and thereafter extruded using a single screw extruder Laboplastomill (manufactured by Toyo Seiki Seisaku-sho, Ltd., model 20C200) equipped with a T-die having a width of 150 mm under conditions at a processing temperature of 160° C. and a screw rotation frequency of 30 rpm to produce sheets having a thickness of 0.1 mm. From thus resulting sheets, dumbbells (JIS K7113, small test piece No. 2(⅓)) were produced in an MD direction (along the stream) by punching. Thus resulting dumbbell test pieces were preserved for 7 days, 60 days or 90 days at 23° C. in an atmosphere with a humidity of 50% after the extrusion molding to form sheets. Using a tensile tester (manufactured by Shimadzu Corporation, AUTOGRAPH AG2000A), a tensile test was performed under a condition of the tensile test speed being 33 mm/min.

Impact Resistance

The pellets obtained in Examples 1 to 3 and Comparative Examples 1 to 4 were dried at 80° C. for 5 hrs, and thereafter sheets having a thickness of 1 mm were produced using a hot pressing machine (manufactured by SHINTO Metal Industries Corporation, compression molding machine NSF-50) under conditions at 170° C. with a load of 5 MPa. From thus resulting sheets, samples of 50 mm square were cut out to produce test pieces. Thus resulting test pieces were preserved for 7 days or 60 days at 23° C. in an atmosphere with a humidity of 50% after the hot press molding to form sheets, and the impact strength (23° C.) was evaluated with a DuPont impact test (Toyo Seiki Seisaku-sho, Ltd.) with a diameter of impact center being φ12.7 mm.

Surface Properties (Bleed Characteristics)

The sheets of 50 mm square×0.1 mm in thickness obtained by the aforementioned extrusion molding to form sheets were preserved in an oven (manufactured by Tabai Espec Corp., SHPS-222) with a setting temperature of 100° C. for 24 hrs, and the state of bleed of the sheet surface was observed and evaluated.

A: bleed not found
B: bleed found a little
C: bleed found

Sheet Moldability

Surface properties of the drawn roll face and the sheet 10 min after initiating aforementioned molding to form sheets were visually observed, and evaluated.

A: no cohesion to the drawn roll found, also revealing favorable surface properties (smoothness) of the sheet.
B: cohesion to the drawn roll found a little, and uneven surface properties (smoothness) of the sheet found.
C: significant cohesion to the drawn roll found, also revealing unfavorable surface properties (smoothness) of the sheet.

Heat Resistance: Heat Deformation Temperature (HDT) Measurement Method

The pellets obtained in Examples 1 to 3 and Comparative Examples 1 to 4 were dried at 80° C. for 5 hrs, and thereafter test pieces of 127 mm×12.7 mm×6.4 mm in thickness were produced under conditions of a cylinder setting temperature being 150° C. and a mold temperature of 60° C. using an injection molding machine (manufactured by Toshiba Machine Co., Ltd., IS75E, clamping force: 75 ton). The heat deformation temperature at a load of 0.45 MPa was determined on the resulting test piece according to JIS K7207 (method A).

Japan Steel Works, Ltd., TEX30a) at a cylinder preset temperature of 130° C. to obtain a pellet of the composition was obtained. Thus resulting composition was evaluated on the molding processability, the impact resistance, the tensile elongation at break, the bleed characteristics and the heat resistance. The results are shown in Table 2.

COMPARATIVE EXAMPLES 5 TO 9

At the blending proportion shown in Table 2, pellets of resin compositions were obtained in a similar operation to that in Example 4. Thus resulting resin composition pellet was evaluated on the molding processability, the impact resistance, the tensile elongation at break, the bleed characteristics and the heat resistance. The results are shown in Table 2.

Evaluation methods of the resulting resin compositions are as in the following.

Evaluation of Tensile Elongation Characteristics The pellets obtained in Examples 4 to 9 and Comparative Examples 5 to 9 were dried at 80° C. for 5 hrs, and thereafter extruded using a single screw extruder Laboplastomill (manufactured by Toyo Seiki Seisaku-sho, Ltd., model 20C200) equipped with a T-die having a width of 150 mm under conditions at a processing temperature of 160° C. and a screw rotation frequency of 30 rpm to produce sheets having a thickness of 0.1 mm. From thus resulting sheets, dumbbells (JIS K7113, small test piece No. 2(⅓)) were produced in an MD direction (along the stream) by punching. Thus resulting dumbbell test pieces

TABLE 1

|  |  | Example | | | Comparative Example | | | |
| --- | --- | --- | --- | --- | --- | --- | --- | --- |
|  | Unit | 1 | 2 | 3 | 1 | 2 | 3 | 4 |
| (A-1) PHBH (3HH 12%) | Part by | 100 | 100 | 100 | 100 | 100 | 100 | 100 |
| (B-1) plasticizer | weight | 20 | 10 | 5 |  |  |  | 60 |
| (B-2) plasticizer |  |  |  |  | 10 |  |  |  |
| (B-3) plasticizer |  |  |  |  |  | 10 |  |  |
| (D-1) nucleating agent |  | 1 | 1 | 1 | 1 | 1 | 1 | 1 |
| (E-1) stabilizer |  | 0.2 | 0.2 | 0.2 | 0.2 | 0.2 | 0.2 | 0.2 |
| Heat resistance | ° C. | 89 | 90 | 91 | 90 | 87 | 86 | 80 |
| Tensile elongation at break (7 days after forming sheet) | % | 425 | 416 | 380 | 282 | 370 | 160 | 170 |
| Tensile elongation at break (60 days after forming sheet) | % | 390 | 370 | 350 | 289 | 300 | 120 | 130 |
| Tensile elongation at break (90 days after forming sheet) | % | 340 | 320 | 300 | 228 | 240 | 80 | 100 |
| Impact resistance (7 days after forming sheet) | kg · cm | 35 | 30 | 30 | 25 | 30 | 30 | 35 |
| Impact resistance (60 days after forming sheet) | kg · cm | 35 | 30 | 30 | 20 | 20 | 15 | 35 |
| Bleed characteristics | — | B | A | A | A | B | B | C |
| Sheet moldability | — | A | A | A | B | B | B | C |

From the results shown in Table 1, Examples 1 to 3 demonstrated greater initial tensile elongation at break and impact value as compared with Comparative Examples 1 to 4, with less time dependent alteration, and also excellent bleed characteristics, heat resistance and sheet moldability were proven according to Examples 1 to 3.

EXAMPLES 4 TO 9

A mixture of poly[3-hydroxybutyrate-co-3-hydroxyhexanoate] (PHBH), poly 3-hydroxybutyrate (PHB), the plasticizer, the nucleating agent and the antioxidant blended with a compounding proportion shown in Table 2 was subjected to melt kneading using a twin screw extruder (manufactured by were preserved for 7 days or 60 days at 23° C. in an atmosphere with a humidity of 50% after the extrusion molding to form sheets. Using a tensile tester (manufactured by Shimadzu Corporation, AUTOGRAPH AG2000A), a tensile test was performed under a condition of the tensile test speed being 33 mm/min.

Evaluation of Molding Processability The pellets obtained in Examples 4 to 9 and Comparative Examples 5 to 9 were dried at 80° C. for 5 hrs, and thereafter extruded using a single screw extruder Laboplastomill (manufactured by Toyo Seiki Seisaku-sho, Ltd., model 20C200) equipped with a T-die having a width of 150 mm under conditions at a processing temperature of 160° C. and a screw rotation frequency of 30 rpm. The maximum drawing speed that enables release to be achieved from the metal roll (temperature regulated to 60° C.) in the extrusion with the T-die was determined for evaluation.

Impact Resistance

The pellets obtained in Examples 4 to 9 and Comparative Examples 5 to 9 were dried at 80° C. for 5 hrs, and thereafter sheets having a thickness of 1 mm were produced using a hot pressing machine (manufactured by SHINTO Metal Industries Corporation, compression molding machine NSF-50) under conditions at 170° C. with a load of 5 MPa. From thus resulting sheets, samples of 50 mm square were cut out to produce test pieces. Thus resulting test pieces were preserved for 7 days or 60 days at 23° C. in an atmosphere with a humidity of 50% after the hot press molding to form sheets, and the impact strength (23° C.) was evaluated with a DuPont impact test (Toyo Seiki Seisaku-sho, Ltd.) with a diameter of impact center being ϕ12.7 mm.

Bleed Characteristics

The sheets of 50 mm square×0.1 mm in thickness obtained by the aforementioned extrusion molding to form sheets were preserved in an oven (manufactured by Tabai Espec Corp., SHPS-222) with a setting temperature of 100° C. for 24 hrs, and the state of bleed of the sheet surface was observed and evaluated.

A: bleed not found
B: bleed slightly found
C: bleed found

Heat Resistance: Heat Deformation Temperature (HDT) Measurement Method The pellets obtained in Examples 4 to 9 and Comparative Examples 5 to 9 were dried at 80° C. for 5 hrs, and thereafter test pieces of 127 mm×12.7 mm×6.4 mm in thickness were produced under conditions of a cylinder setting temperature being 150° C. and a mold temperature of 60° C. using an injection molding machine (manufactured by Toshiba Machine Co., Ltd., IS75E, clamping force: 75 ton). The heat deformation temperature at a load of 0.45 MPa was determined on the resulting test piece according to JIS K7207 (method A).

INDUSTRIAL APPLICABILITY

The composition of the present invention is formed into a variety of molded articles such as fiber, string, rope, woven fabric, knit fabric, nonwoven fabric, paper, film, sheet, tube, plate, bar, vessel, bag, accessory, and the like, which may be used alone. Alternatively, it can be used by combining with a variety of fiber, string, rope, woven fabric, knit fabric, nonwoven fabric, paper, film, sheet, tube, plate, bar, vessel, bag, accessory, foam or the like constituted with a simple substance other than this composition to improve the physical property of the simple substance. The molded article obtained in this manner can be suitably used in fields such as agriculture, fishery, forestry, horticulture, medicine, sanitary goods, food industry, clothing, nonclothing, packaging, automobile, building material, and others.

The invention claimed is:

1. A resin composition comprising a biodegradable 3-hydroxyalkanoate copolymer (A) and a plasticizer (B), wherein:
    the biodegradable 3-hydroxyalkanoate copolymer (A) has a recurring unit represented by the structure formula (1): [—CHR—CH$_2$—CO—O—] (wherein, R represents an alkyl group represented by C$_n$H$_{2n+1}$; and n is an integer of 1 to 15) and the copolymer (A) is constituted with poly[3-hydroxybutyrate-co-3-hydroxyhexanoate] having a recurring unit of 3-hydroxybutyrate and a recurring unit of 3-hydroxyhexanoate as a principal component;
    the plasticizer (B) is constituted with 100 to 50% by weight of a polyglycerol acetic acid ester having an acetylation degree of no less than 50%, and 0 to 50% by weight of a monoglycerol ester; and
    the resin composition comprises 0.1 to 50 parts by weight of the plasticizer (B) based on 100 parts by weight of the copolymer (A).

2. The resin composition according to claim 1 further comprising (C) a biodegradable poly 3-hydroxyalkanoate having

TABLE 2

|  | Unit | Example | | | | | | Comparative Example | | | | |
|---|---|---|---|---|---|---|---|---|---|---|---|---|
|  |  | 4 | 5 | 6 | 7 | 8 | 9 | 5 | 6 | 7 | 8 | 9 |
| (A-1) PHBH (HH rate = 12%) | part by | 100 | 100 | 100 | 100 | 100 | 100 | 100 | 100 | 100 | 100 | 100 |
| (B-1) plasticizer | weight | 10 | 20 | 10 | 10 | 5 | 3 |  |  |  |  | 60 |
| (B-2) plasticizer |  |  |  |  |  |  |  |  |  | 10 |  |  |
| (B-3) plasticizer |  |  |  |  |  |  |  |  |  |  | 10 |  |
| (C-1) PHB |  |  | 10 | 10 | 5 | 5 | 5 |  | 10 | 10 | 10 | 10 |
| (D-1) nucleating agent |  | 1 | 1 | 1 | 1 | 1 | 1 | 1 | 1 | 1 | 1 | 1 |
| (E-1) stabilizer |  | 0.2 | 0.2 | 0.2 | 0.2 | 0.2 | 0.2 | 0.2 | 0.2 | 0.2 | 0.2 | 0.2 |
| Tensile elongation at break (7 days after forming sheet) | % | 416 | 390 | 373 | 423 | 363 | 350 | 282 | 276 | 344 | 148 | 420 |
| Tensile elongation at break (60 days after forming sheet) | % | 370 | 372 | 350 | 403 | 252 | 204 | 289 | 40 | 120 | 31 | 399 |
| Impact resistance (7 days after forming sheet) | kg · cm | 30 | 35 | 30 | 30 | 30 | 25 | 25 | 18 | 30 | 30 | 35 |
| Impact resistance (60 days after forming sheet) | kg · cm | 30 | 35 | 30 | 30 | 30 | 25 | 20 | 12 | 20 | 15 | 35 |
| Heat resistance | ° C. | 91 | 90 | 91 | 90 | 92 | 92 | 90 | 92 | 90 | 91 | 81 |
| Molding processability | m/min | 0.4 | >4 | >4 | 3 | 3 | 3 | 0.5 | >4 | >4 | >4 | >4 |
| Bleed characteristics | — | A | B | A | A | A | A | A | A | C | C | C |

From the results shown in Table 2, Examples 4 to 9 demonstrated greater initial tensile elongation at break and impact value as compared with Comparative Examples 5 to 9, with less time dependent alteration, and also excellent bleed characteristics and heat resistance were proven according to Examples 5 to 9. Furthermore, Examples 5 to 9 exhibited extremely superior molding processability.

a melting temperature Tm2 higher than the melting temperature Tm1 of the copolymer (A), wherein:
    the melting temperature Tm2 of the biodegradable poly 3-hydroxyalkanoate (C) satisfies the relational expression of Tm2≧Tm1+5° C. and wherein the melting temperatures Tm1 and Tm2 is determined on the basis of a peak of the endothermic curve drawn along with melting of 1 to 10 mg of a sample of the copolymer (A) or the biodegradable poly 3-hydroxyalkanoate (C) by elevating the temperature from 30° C. at a rate of 10° C/min until being raised to 30 to 40° C. higher than the temperature at which each sample is sufficiently melted, then lowering the temperature at a rate of 10° C/min to 30° C., and again elevating the temperature at a rate of 10° C/min until being raised to 30 to 40° C. higher than the temperature at which each sample is sufficiently melted, using a differential scanning calorimeter; and the resin composition contains 0.1 to 30 parts by weight of the biodegradable poly 3-hydroxyalkanoate (C) based on 100 parts by weight of the copolymer (A).

3. The resin composition according to claim 1 wherein the copolymer (A) has a weight average molecular weight of 300,000 to 3,000,000.

4. The resin composition according to claim 1 wherein the component ratio of the recurring units of the poly[3-hydroxybutyrate-co-3-hydroxyhexanoate] in terms of 3-hydroxybutyrate unit/3-hydroxyhexanoate unit is 99/1 to 80/20 (mol/mol).

5. The resin composition according to claim 1 wherein the polyglycerol acetic acid ester having an acetylation degree of no less than 50% is at least one selected from the group consisting of a diglycerol acetic acid ester and a triglycerol acetic acid ester having an acetylation degree of no less than 50%.

6. The resin composition according to claim 1 wherein the monoglycerol ester is diacetylmonoacylglycerol with a constitutive fatty acid having no less than 8 carbon atoms.

7. The resin composition according to claim 2 wherein the biodegradable poly 3-hydroxyalkanoate (C) is poly 3-hydroxybutyrate.

* * * * *